Patented Feb. 10, 1925.

1,525,738

UNITED STATES PATENT OFFICE.

BENNO HOMOLKA, OF FRANKFORT-ON-THE-MAIN, GERMANY, ASSIGNOR TO FARB-WERKE VORM. MEISTER LUCIUS & BRUNING, OF HOCHST-ON-THE-MAIN, GERMANY, A CORPORATION OF GERMANY.

ACID DISAZO-DYESTUFFS CONTAINING A DIPHENYLDIALKYLMETHANE NUCLEUS AND PROCESS OF MAKING THE SAME.

No Drawing.  Application filed October 29, 1923. Serial No. 671,500.

*To all whom it may concern:*

Be it known that I, BENNO HOMOLKA, a citizen of Germany, residing at Frankfort-on-the-Main, Germany, have invented certain new and useful Improvements in Acid Disazo-Dyestuffs Containing a Diphenyldialkylmethane Nucleus and Processes of Making the Same, of which the following is a specification.

I have found that acid azo dyestuffs, the chemical composition of which may be represented by the general formula

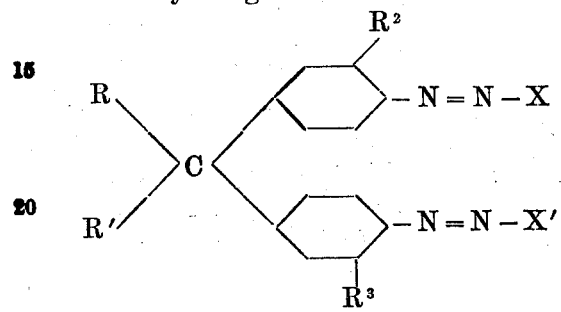

wherein R and R' stand for alkyl groups, $R^2$ and $R^3$ stand for hydrogen, alkyl or alkyloxy groups and X and X' stand for sulfonic acid groups, may be prepared by combining the tetrazo compounds of bases, the chemical composition of which may be represented by the general formula

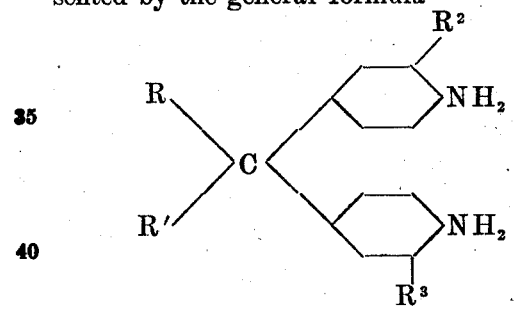

wherein R and R' stand for alkyl groups, and $R^2$ and $R^3$ stand for hydrogen, alkyl or alkyloxy groups with any two sulfonic acids such as the naphtholsulfonic acids including for instance the aminonaphtholsulfonic acids and pyrazolonesulfonic acids as coupling components.

The just mentioned bases among which p-p'-diaminodiphenyldimethylmethane is to be regarded as the simplest representative may be made by the action of aliphatic ketones, for example, acetone, upon the salts of aniline bases, for example aniline hydrochloride. Either two of the same or two different sulfonic acids may serve as coupling components.

The coupling is advantageously carried out in an alkaline solution, for instance, in a solution of sodium carbonate or bicarbonate or a dilute caustic soda solution.

The dyestuffs are of excellent fastness to washing, fulling and to light and in the dry state are yellow, reddish-brown and violet brown powders which dye wool yellow and red to bluish-violet tints. The dyes yield upon reduction besides the starting bases the amino-compounds of the coupling components.

The following examples serve to illustrate the invention:

(1) 22.6 kg. of p-p'-diaminodiphenyldimethylmethane are tetrazotized in the usual manner with 50 kg. of hydrochloric acid of 20° Bé. and 14 kg. or sodium nitrite and the resulting tetrazo-solution is run into a solution of 50 kg. of 1.5-sodium naphtholsulfonate rendered alkaline with sodium carbonate. After the coupling is completed the dyestuff is salted out, filtered and dried. It is a reddish-brown powder and dyes wool in an acid bath bluish-red tints.

(2) Into a tetrazo-solution formed as described in example (1) to which sodium carbonate or bicarbonate has been added until the acid reaction has disappeared, is run a solution of the sodium salt of 24.6 kg. of 1,5-naphtholsulfonic acid and 8.4 kg. of bicarbonate or 5.3 kg. of sodium carbonate. When the coupling reaction is complete there is run into the solution of the resulting intermediate product a solution of 34.8 kg. of the di-sodium salt of 1.3.6-naphtholdisulphonic acid with an excess of sodium carbonate. Or the intermediate product may also be salted out of the solution in which it is formed and separated therefrom by filtration and then triturated with water and run into the soda alkaline solution of the 1.3.6-naphtholdisulfonic acid. The dyestuff obtained is salted out in the usual manner, filtered and dried. It is a reddish-brown powder which dyes wool in an acid bath bluish-red tints.

If instead of the base mentioned in examples (1) and (2) other diamino bases of similar constitution, for instance, p-p'-diamino di-o-tolyl-dimethylmethane or p-p'-diamino-di-o-methoxyphenyl-dimethylmethane or for instance p-p' diamino-diphenyl-methylethylmethane in equimolecular quantities are used, tints with a more bluish hue and of equally good properties are obtained.

When using the pyrazolone sulfonic acids, for instance 1(2-chloro-5-sulfophenyl)-3-methyl-5-pyrazolone, as coupling components, products which dye wool greenish to reddish-yellow tints are obtained. If the coupling is carried out for instance with 1-8-4-dihydroxynaphthalene sulfonic acid, 1-8-4 aminonaphtholsulfonic acid, 1-8-3-6-dihydroxynaphthalenedisulfonic acid, 1-8-3-6-aminonaphtholdisulfonic acid, acetyl 1-8-3-6-aminonaphtholdisulfonic acid etc., reddish to bluish violet dyestuffs, depending upon the base employed, are obtained. The dyestuffs are fast to washing and fulling and possess a particular fastness to light.

Having now described my invention, what I claim is:

1. As new products, the azo-dyestuffs of the formula:

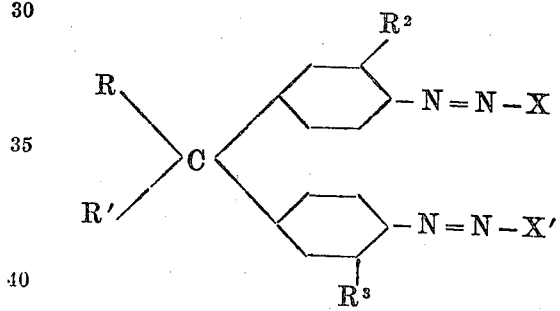

wherein R and R' stand for alkyl groups, $R^2$ and $R^3$ stand for hydrogen, alkyl or alkyloxy groups and X and X' stand for any of the naphtholsulfonic acid, aminonaphtholsulfonic acid, and the pyrazolonesulfonic acid groups, said dyestuffs, when dry, being yellow, reddish-brown and violet brown powders which dye wool yellow and red to bluish-violet tints and which on reduction furnish, besides the starting bases, the amino compounds of the coupling components used.

2. The process of preparing azo-dyestuffs, which comprises combining the tetrazo-compound of bases of the general formula:

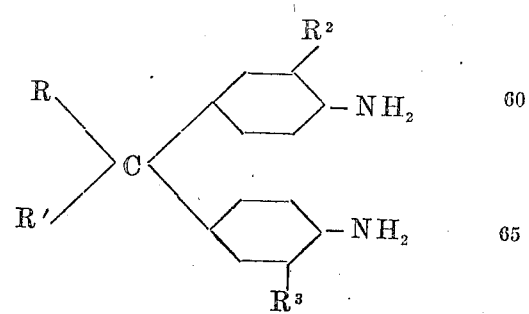

wherein R and R' stand for alkyl groups and $R^2$ and $R^3$ stand for hydrogen, alkyl or alkyloxy groups, with any of the naphtholsulfonic acids, aminonaphtholsulfonic acids and pyrazolone sulfonic acids.

In testimony whereof I affix my signature.

BENNO HOMOLKA.

In the presence of—
 GABRIELE FLESCH,
 H. L. CHICBERT.